United States Patent [19]

Galyon

[11] 3,824,017

[45] July 16, 1974

[54] METHOD OF DETERMINING THE THICKNESS OF CONTIGUOUS THIN FILMS ON A SUBSTRATE

[75] Inventor: George Tipton Galyon, Fishkill, N.Y.

[73] Assignee: International Business Machines Corporation, Armonk, N.Y.

[22] Filed: Mar. 26, 1973

[21] Appl. No.: 344,804

[52] U.S. Cl. .................. 356/108, 356/118, 356/161

[51] Int. Cl. .................. G01b 9/02

[58] Field of Search ........... 356/114, 115, 118, 108; 250/219 TH; 350/164, 166, 152

[56] References Cited

UNITED STATES PATENTS

| | | | |
|---|---|---|---|
| 3,179,899 | 4/1965 | Fox | 350/164 |
| 3,612,692 | 10/1971 | Kruppa | 356/108 |

OTHER PUBLICATIONS

Strong, Concepts of Classical Optics, Freeman & Co., San Francisco, 1958, pp. 115 and 248–255.

Bratter, IBM Tech. Disclosure Bulletin, Vol. 15, No. 2, July 1972, p. 679.

*Primary Examiner*—John K. Corbin

*Assistant Examiner*—Conrad Clark

*Attorney, Agent, or Firm*—William J. Dick

[57] ABSTRACT

A method of determining the thickness of each of a plurality of contiguous films on a substrate, the films having known indices of refraction and being transparent to at least some portions of the electromagnetic spectrum. The process disclosed comprises the steps of scanning, at various wavelengths the surface of the composite film with a beam of light within the portion of the spectrum in which the films are transparent, and preferably at an angle of incidence greater than 0°. Either the incident or reflected beam is polarized (in a conventional manner) first in a plane either parallel or perpendicular to the plane of incidence and then in the other plane. The intensity of the reflected polarized beam in each of the perpendicular planes is then measured as the surface is scanned. A trace may then be made of the measured or observed intensity and wavelength and compared with a trace of calculated results of various intensity and wavelengths for various film thicknesses until an approximate coincidence is obtained between the trace of the observed measurements and the trace of the calculated results whereby the thickness of each of the films is established.

13 Claims, 6 Drawing Figures

(OBSERVED)

(CALCULATED)

FIGURE 3A & 3B S/P SPECTRA, $SiO_2/Si_3N_4/Si$ WAFER.

$d2 = SiO_2 = 1158 \pm 2$ Å $d3 = Si_3N_4 = 1500 \pm 10$ Å

FIGURE 4A & 4B S/P SPECTRA, $SiO_2/Si_3N_4/Si$ WAFER.
$d2 = SiO_2 = 8 \pm 2$ Å $d3 = Si_3N_4 = 1580 \pm 10$ Å

METHOD OF DETERMINING THE THICKNESS OF CONTIGUOUS THIN FILMS ON A SUBSTRATE

SUMMARY OF THE INVENTION AND STATE OF THE PRIOR ART

The present invention relates to thickness measurements of individual films of a composite film placed on a substrate, and more particularly relates to a method of non-destructively determining the thickness of individual films which are transparent to some portion of the electromagnetic spectrum, and which are deposited on a substrate.

In recent years in the semiconductor industry, insulating and passivating films have become widely used. The insulating or protective films of glass or silicon nitride are applied to the silicon dioxide which is formed on a silicon wafer. As is well known, many characteristics of the semiconductor devices formed in the wafer are directly dependent upon the thickness of the insulating film. Accordingly, it is incumbent upon the device manufacturer to know, with some preciseness, the thickness of the insulating film so that proper etchants, time of etchants, etc. may be formulated and used. Additionally, as devices become smaller and smaller, and real estate on the wafer becomes more and more valuable, testing the film thickness by any destructive technique which destroys the film also ruins the underlying device.

There are numerous examples in the prior art which exemplify the ability to utilize light to determine the thickness of a single film, without destroying the film. For example, in "Solid State Electronics," Pergamon Press, July 1970, Volume 13, No. 7, pp. 957–960 a method of measuring the thickness of a silicon dioxide ($SiO_2$) layer by an interference method is described. Generally, interferometric techniques may be divided conveniently into two categories: the "Vamfo" technique which was developed principally by W. A. Pliskin and E. E. Conrad and the "Caris" technique as reported by Coyle, Reizman, Goldsmith et al. In the Vamfo technique, interference fringes are formed by varying the angle of observation at a constant wavelength. In the Caris technique, on the other hand, the angle of incidence is maintained constant, but the wavelength is varied. In all of the techniques described in the prior art, it has been possible to measure the thickness of a thin film layer with a relative high degree of accuracy. For example, in the "Solid State Electronics," article (supra) entitled "Thickness Measurement of $SiO_2$ Layers by an Interference Method", a single layer thickness of silicon dioxide, and a method of determining the same is fully discussed. In pp. 807–814 of the aforementioned publication, Vol. 13, No. 6, a technique is described for investigating double layers of thin films on semiconductor devices. In the technique described, it is possible to measure the thickness of one layer when the thickness of the other layer is known. Additionally, under certain circumstances it is even possible, in accordance with the technique set forth in the publication, to determine the thickness of each of two layers. However, even in that instance, it would appear that some etching of the top film, step by step, must be accomplished in order to determine the shape of the traces or envelopes formed in making the calculations of the thickness of each of the films.

In view of the above, it is a principal object of the present invention to provide a method of nondestructively determining the thickness of contiguous films which are transparent to at least some portion of the electromagnetic spectrum and which are deposited on a substrate.

Another object of the present invention is to provide a method of determining the thickness of adjacent, contiguous films utilizing standard equipment but in a novel manner.

Yet another object of the present invention is to provide a method of determining the thickness of adjacent contiguous films which range in thickness from between 0 to 40,000 A or more.

Other objects and a more complete understanding of the invention may be had by referring to the following specification and claims taken in conjunction with the accompanying drawings in which:

Figure 2:
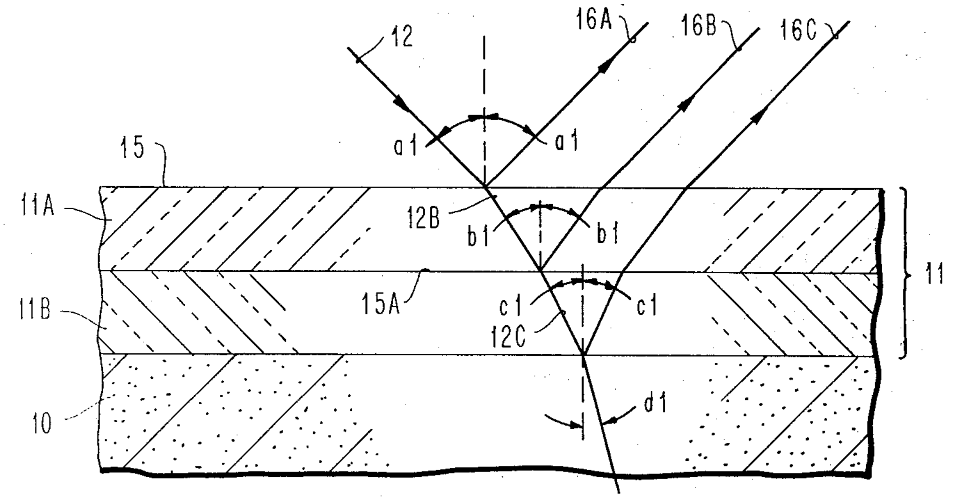
FIG. 2 is an example structure illustrating light refraction and reflectance utilized to determine the thickness of at least a pair of adjacent, contiguous transparent films, in accordance with the method of the present invention.
Figure 3A:
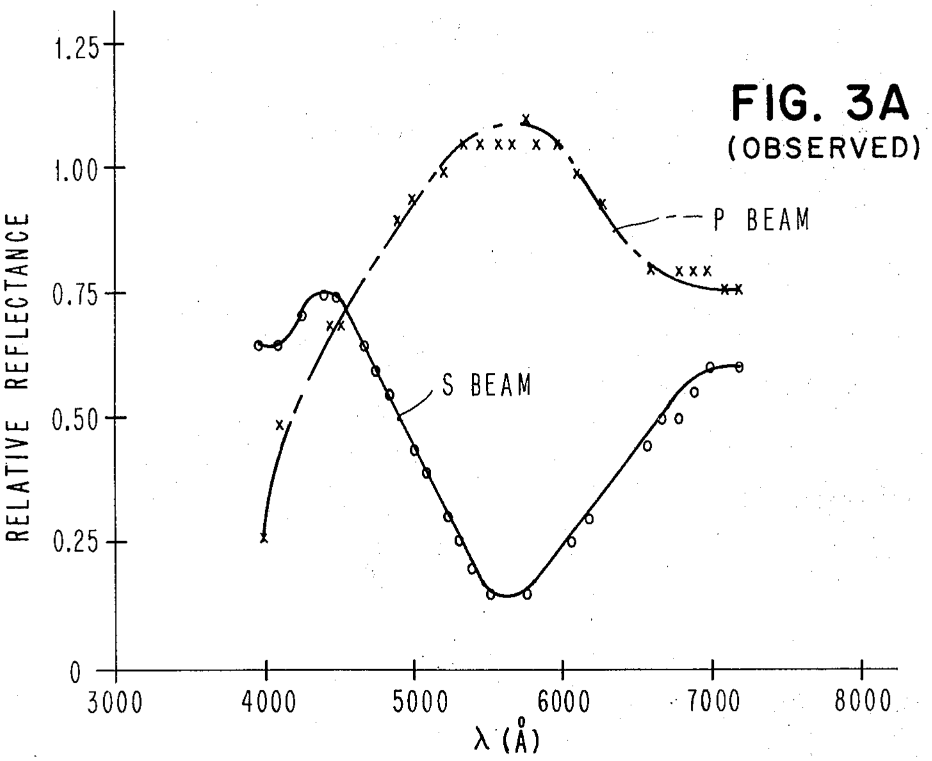
Figure 3B:
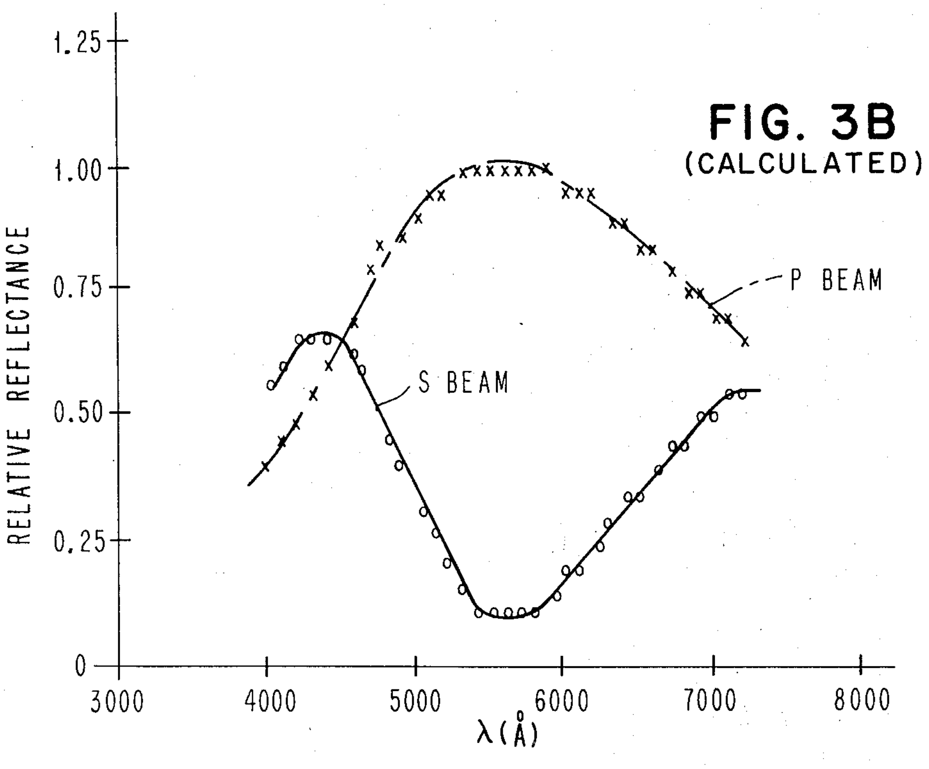
Figure 4A:
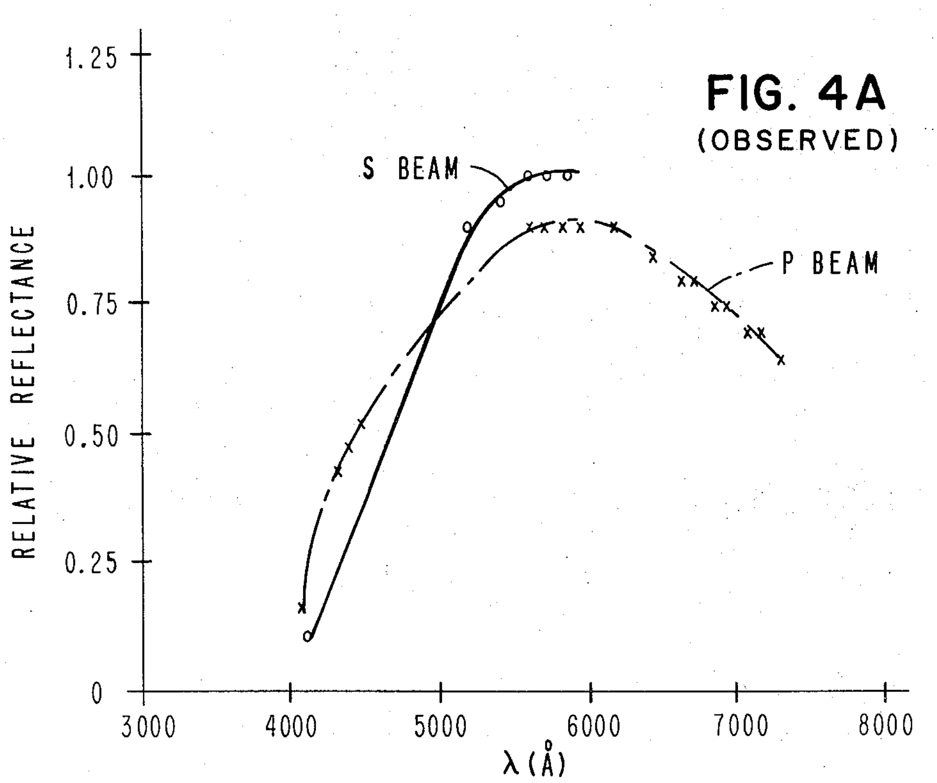
Figure 4B:
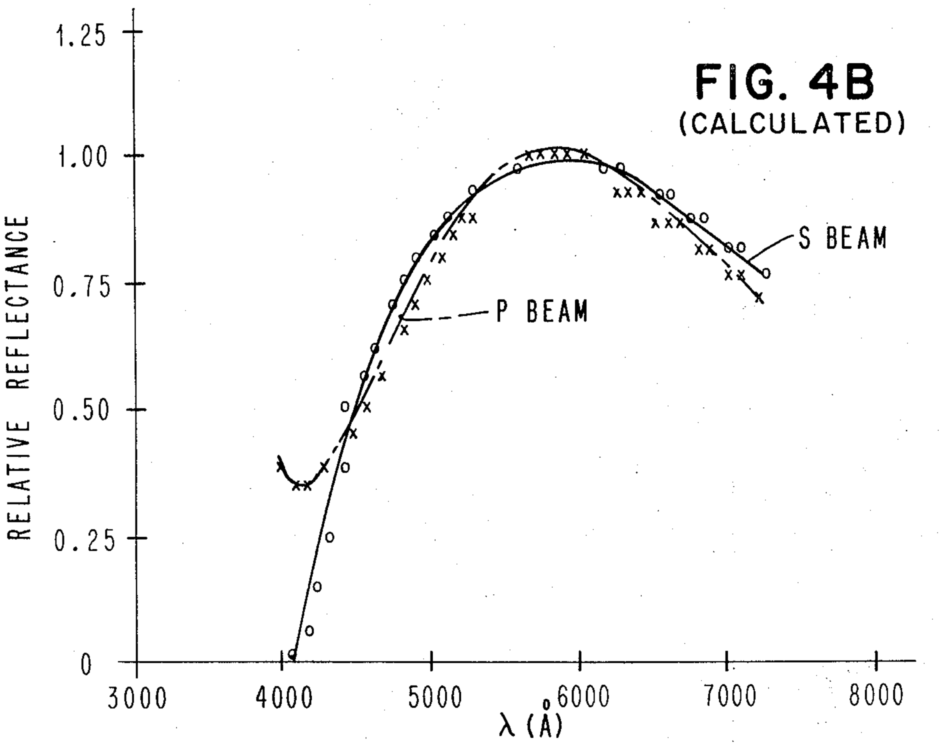

FIGS. 3A and 3B are respectively experimentally observed and calculated traces of a composite film structure such as illustrated in FIG. 2 and the calculated or theoretical trace of the structure shown in FIG. 2; and FIGS. 4A and 4B are respectively another experimentally observed and calculated reflectance value traces versus the theoretically derived or calculated reflectance curves from a composite structure such as illustrated in FIG. 2.

Figure 1:
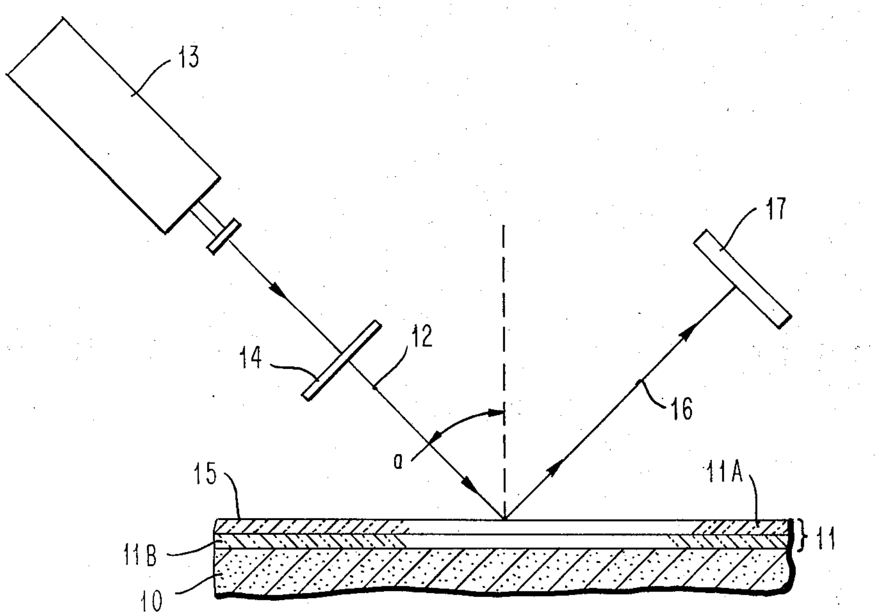
FIG. 1 is a fragmentary schematic view of apparatus utilized to perform the method in accordance with the present invention.

Referring now to the drawings, and especially FIG. 1 thereof, a substrate 10 having a composite film 11 thereon, and composed of at least two films, in the illustrated instance an upper film aa- and a lower film 11B, is illustrated as being scanned by a beam of electromagnetic radiation 12. The beam emanates from a light source 13 and passes through a polarizer 14 before striking the upper surface 15 of the composite film, at an angle *a* (the incident angle). The reflected beam 16 is received by a commercially available spectrophotometer 17, such as a Beckman Instruments Acta series UV–VIS Spectrophotometer which has been fitted with a variable angle reflectance attachment. The polarizer 14 can be either a calcite crystal or a piece of polarizing film such as Polaroid (a trademark of the Polaroid Corporation) film, and it may be placed either in the incident beam 12 or reflected beam 16, whichever is the more convenient.

In accordance with the invention, the composite film 11 is successively scanned across a spectrum of electromagnetic radiation with successive beams of polarized light, one beam adjusted so that the incident beam is polarized perpendicular to the plane of incidence, and one beam with the beam polarized parallel to the plane of incidence. The reflectivity, (relative reflectance) is recorded during each scan, and a representation, in the present instance, a trace is made of each of the reflected measurements (i.e. reflectance versus wavelength) so as to define a curve of the reflected values, and the representation or traces are then compared to calculated or theoretical values in a like representation or trace until an approximation is obtained of the theoretical traces versus the measured traces at which time the thicknesses of each of the film may be determined.

To this end and referring now to FIG. 2, the incident beam 12 is scanned across at least some portion of the electromagnetic spectrum to which the films 11A and 11B are transparent, typically the range falling within the ultraviolet-visible electromagnetic radiation spectrum. The films 11A and 11B must also have known indices of refraction, which may be determined in any well known manner. The polarizer 14, in the illustrated instance located in the beam emanating from the light source 13, is positioned so that the impinging beam of electromagnetic radiation is polarized in a first plane either parallel (P-beam) or perpendicular (S-beam) to the plane of incidence, and then in the opposite plane, the impinging beam being scanned (as to wave length) on the surface 15 of the uppermost or top film 11A. As the beam impinges upon the surface 15 at an angle "*a*1" relative thereto, a portion of the beam is reflected forming the ray or beam 16A (a part of the composite beam 16 illustrated in FIG. 1) and reflects at the angle "*a*1" in accordance with the law of reflectance. However, part of the beam or ray 12 refracts forming beam 12B, the angle of incidence of the beam 12B with respect to the innerface 15A between the film 11A and 11B, being at an angle "*b*1," a portion of that beam or ray being reflected back and forming reflected beam 16B, which of course also reflects at an angle "*b*1" from the surface 15A and emerges parallel to the beam 16A. In a like manner part of the beam 12B refracts forming an angle of incidence "*c*1" in the film 11B and reflects at an angle "*c*1" forming a beam 16C, the beam 16C emerging parallel to the beam 16B in the film 11A and as it emerges from the film 11A. Of course a small portion of the beam enters the substrate and is refracted at an angle "*d*1." The beams 16A–16C are then detected by the spectrophotometer 17 and the intensity is recorded at various wavelengths. The polarizer is then turned 90° so that a scan may be made parallel to the plane of incidence (or perpendicular to the plane of incidence, whichever way was accomplished in the first instance the opposite will then be performed) and the intensity may then be recorded once again versus various wavelengths.

Although the angle of incidence may be any angle greater than 0° for both measurements, as a practical matter it is preferable to provide an angle of incidence substantially greater than 0° for ease of detection, and because the greater the angle of incidence the greater the difference in reflectivity for both the polarized beam which is perpendicular to the plane of incidence (S-beam) and the beam which is polarized parallel to the plane of incidence (P-beam). A trace of the S and P beams with coordinates of reflectance versus angle of incidence of the beams indicates that the beams coincide at zero degrees and then diverge at a relatively slow rate until an angle of incidence of approximately 20° is reached, and then at a more rapid rate of divergence. The traces thereafter (at approximately 70°–80°) tend to converge and do converge at an angle of incidence of approximately 90°. (See FIG. 1.12, page 44 of "Principles of Optics," 4th Edition, Born and Wolf). Accordingly, the angle of incidence, as a practical matter, is preferably made greater than 20° and less than 90°

Typical examples of the results of the novel method employed in accordance with the present invention, for determining the thickness of each of a pair of adjacent, contiguous film forming a composite film, is shown in FIGS. 3A, 3B, 4A and 4B. In each of the examples the substrate 10 was silicon having a film of silicon nitride ($Si_3N_4$) 11B and an adjacent superimposed film 11A of silicon dioxide ($SiO_2$) thereon, was measured using the method defined and described above. Referring now to FIGS. 3A and 3B, 4A and 4B, the light source 13 was placed at an angle of incidence greater than 20° and the polarizer was set to first measure the reflectance at various wavelengths of the S beam. In FIG. 3A, the representation or trace made of the S-beam is illustrated, showing a trace of the relative reflectance versus the wavelength of the S-beam over a portion of the electromagnetic spectrum to which the $Si_3N_4$ and $SiO_2$ were transparent. The relative reflectance of the P-beam was then measured and a trace drawn so that both traces appear on the graph shown in FIG. 3A. Thereafter the curves shown in FIG. 3B were drawn by calculation using the following formulae, readily obtained from Born and Wolf Supra, pp. 55–67, et seq. Equations and terms used in finding thicknesses of both layers.

$n1$ = index of refraction of air
$n2$ = index of refraction of film 11A, (in Ex., $SiO_2$)
$n3$ = index of refraction of film 11B, (in Ex., $Si_3N_4$)
$n4$ = index of refraction of substrate 10 (in Ex., Si)
$d2$ = thickness of film 11A
$d3$ = thickness of film 11B
$Rs$ = Amplitude ratio of reflected to incident S-beam $Rp$ = Amplitude ratio of reflected to incident P-beam Absolute reflectivity Ra is given by
$RpRp^*$ or $RsRs^*$ where $Rp^*$ and $Rs^*$ is the complex conjugate, respectively, of Rp and Rs.
Therefore $Ra1 = RpRp^*$ $Ra2 = RsRs^*$
$Go$ = Wavelength of incident radiation in Vacuo

EQUATIONS (1)

$$Rs = \frac{(m11 + m12\ P4)\ P1 - (m21 + M22\ P4)}{(m11 + m12\ P4)\ P1 + (m21 + m22\ P4)}$$

(2)

$$Rp = \frac{(m'11 + m'12\ Q4)\ Q1 - (m'21 + m'22\ Q4)}{(m'11 + m'12\ Q4)\ Q1 + (m'21 + m'22\ Q4)}$$

For the case of a double composite film:

$$m11 = \text{Cos } B2 \text{ Cos } B3 - (P3/P2) \text{ sin } B2 \text{ Sin } B3 \quad (3)$$
$$M12 = -i\,[(\text{Cos } B2 \text{ Sin } B3/P3) + (\text{Sin } B2 \text{ Cos } B3/P2)] \quad (4)$$
$$M21 = -i\,(P2 \text{Sin } B2 \text{ Cos } B3 + P3 \text{ Cos } B2 \text{ Sin } B3) \quad (5)$$
$$M22 = \text{Cos } B2 \text{ Cos } B3 - (P2/P3) \text{ Sin } B2 \text{ Sin } B3 \quad (6)$$

To determine $m'11$, $m'12$, $m'21$ and $m'22$ use equations (3) – (6) with P2 and P3 replaced by Q2 and Q3 respectively, where:

| For S-beam | For P-beam |
|---|---|
| $P1 = n1 \cos a1$ | $Q1 = \cos a1/n1$ |
| $P2 = n2 \cos b1$ | $Q2 = \cos b1/n2$ |
| $P3 = n3 \cos c1$ | $Q3 = \cos c1/n3$ |
| $P4 = n4 \cos d1$ | $Q4 = \cos d1/n4$ |

$$B2 = (360/Go)\ n2\ d2 \cos b1$$
$$B3 = (360/Go)\ n3\ d3 \cos c1$$

In the examples given in FIGS. 3A and 3B, and in FIGS. 4A and 4B, the optical constants were relatively well known for wavelengths between 3,500 – 8,000 A. Therefore, the only unknowns in the equations for *Ra*1 and *Ra*2 are *d*2 and d3. With a computer an iterative solution, trial and error, was used to produce a pair of curves for each of FIGS. 3B and 4B. Once the calculated curves approximately coincided with the measured curves, with regard to shape, the thicknesses *d*2 and *d*3 become known, inasmuch as they will be the thicknesses used in making the calculated or theoretical matching curves from the equations above.

As a practical matter and in order to make solutioning less difficult and require less manual or computer iteration, if the angle of incidence is set at Brewster's angle, there will be no reflectance of the P beam from the upper surface, and for all practical purposes *Rp* is independent of the thickness of the upper film.

Although no experimentation has yet taken place with more than two films, it is theorized that the same technique and procedure may be utilized for three films merely by measuring the reflected intensity of both the S and P beams at two angles of incidence, and thereafter making four traces on a graph. This should give sufficient information to provide sufficient equations for resolving the unknown thicknesses.

In a like manner it is theorized that with four films the P beam and S beam intensity (reflected) may be plotted at three angles of incidence while scanning at different wave lengths in the electromagnetic spectrum transparent to the four films.

Thus the method of the present invention accurately and quickly is determinative of the thicknesses of adjacent contiguous films forming a composite on a substrate and without destroying any part of the film.

Although the invention has been described with a certain degree of particularity, it is understood that the present disclosure has been made only by way of example and that numerous changes in the method of operation may be made without departing from the spirit and the scope of the invention as hereinafter claimed.

What is claimed is:

1. A method of determining the thickness of a plurality of superimposed films, said films being transparent to at least some portion of the electromagnetic spectrum, comprising the steps of:

illuminating the composite film with varying wave length electromagnetic radiation and polarizing one of the incident and reflected beams perpendicular to the plane of incidence; illuminating the composite film with varying wavelength electromagnetic radiation and polarizing one of the incident or reflected beams parallel to the plane of incidence or reflectance; and measuring the intensity of said reflected polarized beam during said illuminating steps to provide a trace of intensity versus wave length of each of said illuminating steps; matching said observed traces to calculated polarized beam traces of the composite film for varying thicknesses of composite films until an approximation of said observed and calculated traces are obtained.

2. A method in accordance with claim 1 wherein said first and second illuminating steps occur at the same angle of incidence.

3. A method in accordance with claim 1 wherein said angle of incidence is greater than zero for each illuminating step.

4. A method in accordance with claim 3 wherein the angle of incidence is between 20° and 90°.

5. A method in accordance with claim 3 including the step of maintaining in substantial uniformity the angle of incidence for each illuminating step.

6. A method in accordance with claim 3 wherein said angle of incidence is set at Brewster's angle of the upper surface of the composite film.

7. A method of determining the thickness of a plurality of contiguous films having known indices of refraction and which are transparent to at least some portion of the electromagnetic spectrum, comprising the steps of:

illuminating the surface of one of the films with two beams of electromagnetic radiation of varying frequency, one beam polarized in a plane perpendicular to the plane of incidence and the other beam polarized in a plane parallel to the plane of incidence; measuring the intensity of the reflected radiation; making a representation of the intensity and wavelength of said measured reflected radiation of each of said polarized beams, comparing said representation with a like theoretical representation of intensity and wavelengths to thereby determine the thickness of each of said films.

8. A method in accordance with claim 7 wherein said first and second illuminating steps occur at the same angle of incidence.

9. A method in accordance with claim 8 wherein said angle of incidence is set at Brewster's angle of the upper surface of said one of the films.

10. A method of determining the thickness of each of a plurality of contiguous films on a substrate, said films having known relative indices of refraction and being transparent to at least some portion of the electromagnetic spectrum, comprising the steps of:

illuminating at various wavelengths the surface of said composite film with a beam of light within said portion of said spectrum and at an angle of incidence greater than zero.

polarizing one of the incident or reflected beams in a plane parallel to the plane of incidence and in a plane perpendicular to the plane of incidence, measuring the intensity of the reflected polarized beam in each of said perpendicular planes as said surface is illuminated, comparing the observed measurements of intensity and wavelengths with calculated results of intensity and wavelength for various thicknesses until an approximate coincidence is obtained between the observed measurements and the calculated results whereby the thickness of each of said films may be determined.

11. A method in accordance with claim 10 wherein said first and second illuminating steps occur at the same angle of incidence.

12. A method in accordance with claim 11 wherein said angle of incidence is set at Brewster's angle of the upper surface of said composite film.

13. A method of determining the thickness of each of a pair of contiguous films on a silicon substrate, said films and substrate having known relative indices of refraction and being transparent to at least some portion of the electromagnetic spectrum, comprising the steps of:

providing a beam of electromagnetic radiation at an angle of incidence to the surface of the upper film substantially greater than 0°, and at various wavelengths;

polarizing either the incident or reflected beam in one of a plane perpendicular to the plane of incidence and plane parallel to the plane of incidence and then polarizing in the other of said planes;

measuring the intensity of the reflected polarized beam in each of said planes as said beam impinges upon said surface of said upper film;

comparing the observed measurements of intensity and wavelength with calculated results of intensity and wavelength for various thicknesses until an approximate coincidence is obtained between the observed measurements and the calculated results whereby the thickness of each of said films may be determined.

* * * * *